US012566342B2

(12) United States Patent
Le Cain et al.

(10) Patent No.: US 12,566,342 B2
(45) Date of Patent: Mar. 3, 2026

(54) METHOD AND APPARATUS FOR DETECTING OPTICAL DEVICE MIS-ADAPTATION

(71) Applicant: Essilor International, Charenton-le-Pont (FR)

(72) Inventors: Aurélie Le Cain, Charenton-le-Pont (FR); Konogan Baranton, Charenton-le-Pont (FR); Sébastien Fricker, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 400 days.

(21) Appl. No.: 18/245,214

(22) PCT Filed: Aug. 30, 2021

(86) PCT No.: PCT/EP2021/073837
§ 371 (c)(1),
(2) Date: Mar. 14, 2023

(87) PCT Pub. No.: WO2022/058142
PCT Pub. Date: Mar. 24, 2022

(65) Prior Publication Data
US 2023/0393423 A1      Dec. 7, 2023

(30) Foreign Application Priority Data

Sep. 16, 2020     (EP) ..................................... 20306035

(51) Int. Cl.
*G02C 13/00*          (2006.01)
*G02C 7/02*           (2006.01)

(52) U.S. Cl.
CPC ........... *G02C 13/005* (2013.01); *G02C 7/027* (2013.01)

(58) Field of Classification Search
CPC ..... G02C 13/005; G02C 7/027; G02C 13/003
See application file for complete search history.

(56) References Cited

U.S. PATENT DOCUMENTS 10,307,053 B2 *   6/2019   Fayolle ............... G02B 5/1866
2011/0170058 A1    7/2011   Suzuki et al.
(Continued)

FOREIGN PATENT DOCUMENTS

CN       110346946 A      10/2019
EP       1 747 750 A1     1/2007
(Continued)

OTHER PUBLICATIONS

International Search Report & Written Opinion issued Dec. 14, 2021 in PCT/EP2021/073837, filed on Aug. 30, 2021, 15 pages.
(Continued)

*Primary Examiner* — Tuyen Tra
(74) *Attorney, Agent, or Firm* — Oblon, McClelland, Maier & Neustadt, L.L.P.

(57) ABSTRACT

An apparatus for detecting mis-adaptation of an optical device to a wearer includes processing circuitry configured to receive and store over time head data relative to the head of the wearer when wearing and using the optical device, process the head data based on head data patterns associated with known mis-adaptation of an optical device to the wearer of said optical device, and detect mis-adaptation of the optical device to the wearer by matching the received and stored head data with head data patterns associated with mis-adaptation.

15 Claims, 4 Drawing Sheets

(56) References Cited

U.S. PATENT DOCUMENTS

| 2016/0291349 A1 | 10/2016 | Koh et al. |
| 2017/0059886 A1 | 3/2017 | Fayolle et al. |
| 2017/0188807 A1 | 7/2017 | Swital et al. |
| 2018/0252942 A1 | 9/2018 | Gamliel et al. |
| 2018/0256023 A1 | 9/2018 | Swital et al. |
| 2019/0090737 A1 | 3/2019 | Pugh et al. |
| 2020/0183194 A1 | 6/2020 | Escalier et al. |
| 2021/0271117 A1 | 9/2021 | Le Cain et al. |

FOREIGN PATENT DOCUMENTS

| EP | 2 348 350 A1 | 7/2011 |
| EP | 2 866 074 A1 | 4/2015 |
| EP | 3 112 927 A1 | 1/2017 |
| EP | 3 598 209 A1 | 1/2020 |
| EP | 3 686 656 A1 | 7/2020 |
| JP | 2003-126040 A | 5/2003 |
| JP | 2008-521027 A | 6/2006 |
| JP | 2007-536043 A | 12/2007 |
| JP | 2013-11877 A | 1/2013 |
| JP | 2015-524943 A | 8/2015 |
| JP | 2017-219847 A | 12/2017 |
| WO | WO 2006/054985 A1 | 5/2006 |
| WO | WO 2013/179507 A1 | 12/2013 |
| WO | WO 2014/019969 A9 | 2/2014 |

OTHER PUBLICATIONS

Japanese Office Action issued Mar. 11, 2025, in corresponding Japanese Patent Application No. 2023-517370 (with English Translation), 12 pages.

* cited by examiner

METHOD AND APPARATUS FOR DETECTING OPTICAL DEVICE MIS-ADAPTATION

TECHNICAL FIELD

The disclosure relates to an apparatus and the associated methods for detecting a mis-adaptation of an ophthalmic lens provided to a wearer.

Furthermore, the disclosure relates to a computer program product comprising one of more stored sequences of instruction that is accessible to a processor.

BACKGROUND

It is known that for some wearers the provided ophthalmic lens may be mis-adapted. This mis-adaptation may occur over time or occur directly after wearing the ophthalmic lens. Adapting to progressive lenses for example usually requires the wearer to modify his head-eye coordination, to properly use the vision zones of the lens. One cause of mis-adaptation is that certain wearers do not properly use the vision zones of the progressive lens when wearing progressive lenses.

Each wearer develops a particular body posture to perform a specific task, for example reading. If we take into consideration a seated wearer reading a document located on the desk in front of the wearer, different head inclination would be performed by the different wearers so as to read the document.

Eye tracker and motion capture are used in a laboratory to evaluate the head-eye coordination for a wearer. There are smart frames measuring the lowering inclination of the wearer at any time of the day, for example to read or to perform any other task.

The wearer has to go to an optical laboratory, to proceed tasks in a specific environment, to determine ophthalmic lens mis-adaptation. For this reason, mis-adaptation can be detected too late, or not at all, resulting in the wearer's discomfort, or abandoning the use of his ophthalmic equipment.

Therefore, there is a need to detect wearers' mis-adaptations to their ophthalmic lens, in their everyday life environment, taking into consideration their body posture.

There is also a need to handle the wearers who do not adapt to their ophthalmic lens.

SUMMARY

To this end, the disclosure proposes an apparatus for detecting mis-adaptation of an optical device to a wearer, the apparatus comprising processing circuitry configured to:

receive and store over time head data relative to the head of the wearer when wearing and using the optical device, processing the head data based on head data patterns associated with known mis-adaptation of an optical device to the wearer of said optical device, detect mis-adaptation of the optical device to the wearer by matching the received and stored head data with head data patterns associated with mis-adaptation.

Advantageously, the apparatus enables to self-detect optical device mis-adaptation based on head data. The apparatus is able to self-detect the optical device mis-adaptation without requiring the knowledge of an eye care professional.

Moreover, the apparatus enables to detect wearer mis-adaptation based on head data parameter, such as head movements and head postures. An example of head movement is head lowering. If the recorded head data may correspond to an abnormal head data pattern associated with known mis-adaptation, the apparatus detects an optical mis-adaptation.

According to further embodiments which can be considered alone or in combination:

the head data comprises at least one of head posture and motion data, eye gaze direction, eyelid opening, pupil size, EEG data, facial expression; and/or when processing the head data an indication of the wearer's activity is considered to match the received data and stored head data with head data patterns associated with mis-adaptation; and/or the optical device has an ophthalmic function and the processing circuitry is further configured to receive the ophthalmic prescription of the wearer and to consider said ophthalmic prescription when comparing the received and stored head data with head data patterns; and/or the processing circuitry is further configured to alert either the wearer or an eye care professional of the detected mis-adaptation of the optical device; and/or the cause of mis-adaptation is selected in the list consisting of the optical function of the optical device, the mounting parameters of the optical device, the use of the optical device by the wearer, the ophthalmic prescription of the wearer, the integrity of the optical device; and/or the optical device has a progressive additional power and the head data relates to the distribution of head lowering angle of the wearer when using the optical device.

The disclosure further relates to a method performed by processing circuitry of an apparatus, the method comprising:

receiving and storing over time head data relative to the head of the wearer when wearing and using the optical device, processing the head data based on head data patterns associated with known mis-adaptation of an optical device to the wearer of said optical device, detecting mis-adaptation of the optical device to the wearer by matching the received and stored head data with head data patterns associated with mis-adaptation.

Advantageously, detecting mis-adaptation of an optical device to a wearer by matching the received and stored head data with head data patterns associated with mis-adaptation enables to determine a cause of the mis-adaptation. Depending on the cause of the mis-adaptation, a dedicated solution can be provided to the wearer, such as a specific training to improve the adaptation to the optical device or by providing a different optical design.

The method enables to self-detect mis-adaption of the wearer to its optical device. The wearer is not required to go to an optical laboratory and to perform specific tasks to determine whether the optical device is adapted. Based on head data and known mis-adaptation head data pattern, the apparatus can detect itself optical device mis-adaptation According to further embodiments which can be considered alone or in combination:

the head data comprises at least one of head posture and motion data, eye gaze direction, eyelid opening, pupil size, EEG data, facial expression; and/or when processing the head data an indication of the wearer's activity is considered to match the received data and stored head data with head data patterns associated with mis-adaptation; and/or the optical device has an ophthalmic function and the method further comprises receiving the ophthalmic prescription of the wearer and considering said ophthalmic prescription when comparing the received and stored head data with head data patterns; and/or the method further comprises alerting either the wearer or an eye care professional of the detected mis-adaptation of the optical device; and/or the method further comprises determining the cause of the mis-adaptation of the optical device by comparing the received and stored head data with head data patterns; and/or the cause of mis-adaptation is selected in the list consisting of the optical function of the optical device, the mounting parameters of the optical device, the use of the optical device by the wearer, the ophthalmic prescription of the wearer; and/or wherein the optical device has a progressive additional power and the head data relates to the distribution of head lowering angle of the wearer when using the optical device; and/or detecting mis-adaption comprises determining the number of modes in the distribution of head lowering angles.

The disclosure further relates to a method of determining a head pattern, the method comprising:

receiving and storing wearer data relative to wearers of optical devices, receiving and storing optical device data relative to the optical device associated with each wearer, receiving and storing over time head data relative to the head of each wearer when wearing and using the associated optical device, receiving and storing adaptation data relative to the adaptation of the optical device associated with each wearer, processing the received and stored data over a large number of wearers to determine at least one head pattern associated with mis-adaptation of optical devices using a machine learning model to find correlations between head data, (and other optional data), and mis-adaptation comprising:

obtaining the head data, which may consist of several time series of frame measurements, computing descriptive statistics for each time series, grouping the descriptive statistics into a data vector, summarizing the head data, grouping the data relative to adaptation of the optical device associated with each wearer into a single number representing the degree of adaptation, from 1 (non-adaptation) to 10 (perfect adaptation), initiating a machine learning model where the input data is the data vector of each wearer, and the data to predict is the number representing the degree of adaptation, and using the machine learning model to define head data patterns associated with mis-adaptation of optical devices.

According to further embodiments which can be considered alone or in combination:

the head data comprises at least one of head posture data, eye gaze direction, eyelid opening, pupil size; and/or the wearer data comprises the ophthalmic prescription of the wearer and the optical device has an ophthalmic function; and/or wherein optical device data comprises data relative to the optical function of the optical device and/or the mounting parameters of the optical device and/or the use of the optical device by the wearer and/or the ophthalmic prescription of the wearer.

The disclosure further relates to a non-transitory computer-readable storage medium including computer executable instructions, wherein the instructions, when executed by a computer, cause the computer to perform a method performed by processing circuitry of an apparatus according to the disclosure.

The disclosure further relates to a non-transitory computer-readable storage medium including computer executable instructions, wherein the instructions, when executed by a computer, cause the computer to perform a method of determining a head pattern.

BRIEF DESCRIPTION OF THE DRAWINGS

Embodiments of the disclosure will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DETAILED DESCRIPTION

The disclosure relates to an apparatus for detecting mis-adaptation of an optical device to a wearer.

Figure 1:
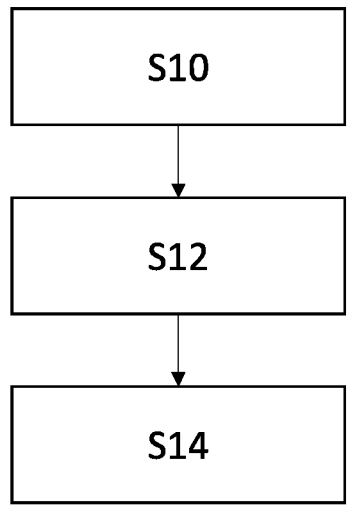
FIG. 1 illustrates a flowchart of the steps performed by the processing circuitry of the apparatus for detecting mis-adaptation of an optical device to a wearer.

A first aspect of the disclosure relates to an apparatus for detecting mis-adaptation of an optical device to a wearer, the apparatus comprising processing circuitry configured to:

receive and store over time head data relative to the head of the wearer when wearing and using the optical device, processing the head data based on head data patterns associated with known mis-adaptation of an optical device to the wearer of said optical device, detect mis-adaptation of the optical device to the wearer by matching the received and stored head data with head data patterns associated with mis-adaptation FIG. 1 is a flowchart showing the diverse steps realized by the processing circuitry of the apparatus.

The apparatus comprising the processing circuitry executes a receiving step S10, where the processing circuitry proceeds to the reception of wearer head data measured by the at least one head data sensor. The processing circuitry stores the measured head data on the data storage medium.

Further, the apparatus comprising the processing circuitry executes a processing step S12 where the processing circuitry proceeds to the comparison of the wearer head data measured and predefined head data patterns associated with a cause of mis-adaptation of an optical device to a wearer.

Finally, the apparatus comprising the processing circuitry executes a detecting step S14 where the processing circuitry proceeds to the detection of mis-adaptation of the optical device to the wearer. Said detection is made by matching the received and stored head data with head data patterns associated with mis-adaptation.

In the context of the present disclosure, the term mis-adaptation relates to a mis-adaptation of an optical device to a wearer. Said mis-adaptation can be caused by the fact that the design of the ophthalmic lens does not take into account the body behavior and body posture of the wearer. An example of the body behavior and posture is the head positioning when the wearer performs a given activity or task.

According to the present disclosure, the term optical device may relate to an optical lens, and even more particularly to an ophthalmic lens. The optical device may be a single vision lens, a bifocal lens, a trifocal lens, a progressive lens, a filter lens, or any other kind of optical device enabling a wearer to improve his vision.

The term head data refers to any data measurable related to the head of a wearer over time. For example, head data may relate to the position or orientation of the head of the wearer with respect to the torso.

In such manner, head data may for example relate to the inclination of the head or the rotation of the head along a horizontal axis. Head data relative to the inclination of the head may be stored in the form of an angular parameter. Such angular parameter may correspond to the lowering angle.

The head data may be obtained using a smart frame. The smart frame corresponds to a frame including a head data sensor to detect a movement of the head of the wearer. The smart frame may for example comprise a head data sensor such has an IMU (Inertial Measurement Unit), in the case where the considered head data correspond to the head displacement. In this example, the head data sensor such as an IMU would detect and transmit to the apparatus information relative to a displacement of the head of a wearer such as an inclination or a rotation of the head of a wearer.

The apparatus according to the present disclosure is configured to receive and store any displacement of the head of the wearer, when the wearer is wearing the optical device.

The apparatus stores the wearer's head data over time. Once wearer's head data are stored on the apparatus, said wearer's head data are compared to previously acquired head data patterns associated with optical device mis-adaptation. Upon said comparison, the apparatus may detect a degree of similarity between the wearer's head data measured and the optical device mis-adaptation head data patterns. Above a given similarity threshold, the apparatus determines that the optical device is not adapted to the wearer.

The degree of similarity may be determined using histogram. For example, based on the wearer's head data over time, a histogram is computed, which describes the frequency of each data value. This histogram is compared to histograms of previously acquired data. The most similar histogram is determined as being the one whose overall shape is closest to the computed one.

The degree of similarity may further be determined using a machine learning algorithm. For example, based on previously acquired data, a machine learning model is built, which determines the mis-adaptation status of an optical device to a wearer based on head data. The model is trained using the acquired data. For example, the model can be a decision tree, or a random forest, or a state vector machine, or a neural network, or a deep learning algorithm. Data of the wearer is fed to the machine learning model in order to determine his mis-adaptation status or degree of similarity.

In case of mis-adaptation of a progressive lens, the wearer may compensate the fact of not being able to look through a specific area of the progressive lens by a head motion. The specific area of the optical device may for example correspond to the near vision zone. The wearer's head data corresponding to an unnatural head posture compensating an inability to look through a specific area is then compared to optical device mis-adaptation head data patterns. Based on said comparison and further similarity with an optical device mis-adaptation head data pattern, the apparatus can determine that the optical device is not adapted to the wearer.

The mis-adaptation of a progressive lens may also be determined based on the fluency of the wearer to find the head posture and gaze through the progressive lens which gives a good vision for any distance. The non-adapted wearers tend to take the same typical and usual postures.

The head data may comprise different parameters among head posture and motion data, eye gaze direction, eyelid opening, pupil size, EEG (Electroencephalography) data, facial expression.

The term head posture corresponds to the specific wearers head positioning with respect to the torso, or to a reference position, in everyday life while performing a specific task.

The term head motion data corresponds to the data measured relative to a displacement of the head.

The term eye gaze direction is defined by two angles measured with regard to a direct orthonormal basis centered on the center of rotation of the right or left eye.

Figure 2A:
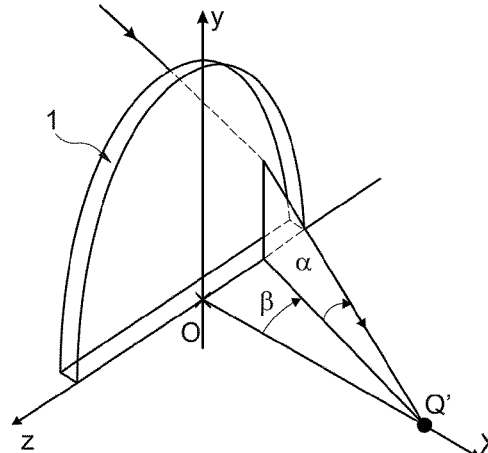
FIGS. 2a and 2b illustrate diagrammatically, optical systems of eye and ophthalmic lens.
Figure 2B:
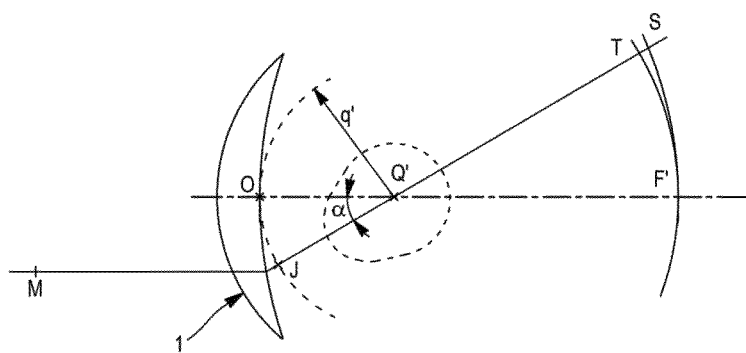

FIGS. 2a and 2b are diagrammatic illustrations of optical systems of eye and lens, thus showing the definitions used in the description. More precisely, FIG. 2a represents a perspective view of such a system illustrating parameters $\alpha$ and $\beta$ used to define a gaze direction. FIG. 2b is a view in the vertical plane parallel to the antero-posterior axis of the wearer's head and passing through the center of rotation of the eye in the case when the parameter $\beta$ is equal to 0.

The center of rotation of the eye is labeled Q'. The axis Q'F', shown on FIG. 2b in a dot-dash line, is the horizontal axis passing through the center of rotation of the eye and extending in front of the wearer—that is the axis Q'F' corresponding to the primary gaze view. This axis cuts the front surface of the optical device, which may be for example a lens, on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As example, a value of radius q' of 25.5 mm corresponds to a usual value and provides satisfying results when wearing the lenses.

A given gaze direction—represented by a solid line on FIG. 2a—corresponds to a position of the eye in rotation around Q' and to a point J of the apex sphere; the angle $\theta$ is the angle formed between the axis Q'F' and the projection of the straight line Q'J on the horizontal plane comprising the axis Q'F'; this angle appears on the scheme on FIG. 2b. The angle $\beta$ is the angle formed between the axis Q'J and the projection of the straight line Q'J on the horizontal plane comprising the axis Q'F'; this angle appears on the scheme on FIG. 2b. A given gaze view thus corresponds to a point J of the apex sphere or to a couple (α, β). The more the value of the lowering gaze angle is positive, the more the gaze is lowering and the more the value is negative, the more the gaze is rising.

The term eyelid opening corresponds to the space between the lower and the upper eyelid, when the upper eyelid is retracted. Wearers may have different eyelid openings. There is a need to provide a suitable device to the wearer taking into account that due to a small eyelid opening, the provided optical device is not adapted to the wearer.

In a further aspect of the disclosure the apparatus may consider other body behavior or posture of the wearer than the head behavior and posture of the wearer in its everyday life.

The optical device may have an ophthalmic function and the processing circuitry is further configured to receive the ophthalmic prescription of the wearer and to consider said ophthalmic prescription when comparing the received and stored head data with head data patterns.

The term processing circuitry may be any electronical controlling unit, such as a microcontroller.

The term "ophthalmic prescription" corresponds to the prescription provided by the eye care person to an optical device to correct the impairment of the wearer once the optical device is worn by the wearer. The ophthalmic function is the correcting function performed by the optical device.

Depending on the ophthalmic function of the optical device and the head data monitored, it may appear that the optical device is not used properly by the wearer or that the optical device is not adapted to the wearer when performing a specific activity, for example reading.

The processing circuitry is further configured to alert either the wearer or an eye care professional of the detected mis-adaptation of the optical device.

The optical device may be provided with an alert device. The alert may be in diverse form, mechanical vibration, sound, etc. The alert signal enables to inform of signs of mis-adaptation of the optical device to the wearer.

Therefore, the alert system can quickly inform the wearer and/or the eye care professional that the optical device is not suitable for the wearer when the wearer tries a new pair of ophthalmic lenses.

Another embodiment of the disclosure would be to inform the wearer and/or the eye care professional that the optical device provided to the wearer does not correspond to the present vision impairment of the wearer and that a new optical device with a new ophthalmic function is required for the wearer to continue to correct his/her visual impairment.

The processing circuitry may further be configured to determine the cause of the mis-adaptation of the optical device by comparing the received head data with different sets of stored head data having head distribution patterns associated with causes of mis-adaptation.

The optical device may be provided with a data storage medium. The data storage medium comprises different sets of stored head data patterns associated to a cause of mis-adaptation. The processing circuitry compares the monitored head data of the wearer, which may also be stored on the data storage medium.

During a comparison, the processing circuitry controls if there is a degree of likelihood above a given threshold for the comparison of a wearer monitored head data pattern and a head data pattern associated with a cause of mis-adaptation. It has to be understood that the degree of likelihood may correspond to a percentage if similitude between measured head data and stored head data pattern associated with causes of mis-adaptation. Above said threshold, the processing circuitry determines that the cause of mis-adaptation of the optical device corresponds to the cause of mis-adaptation of the similar stored head data pattern associated to a cause of mis-adaptation.

The cause of mis-adaptation may also be determined using a machine-learning model that was previously built using the previously acquired data.

The cause of mis-adaptation may be selected in the list consisting of the optical function of the optical device, the mounting parameters of the optical device, the use of the optical device by the wearer, the ophthalmic prescription of the wearer, the integrity of the optical device.

In the sense of the disclosure, the optical function corresponds to a function providing for each gaze direction the effect of the optical lens on the light ray passing through the optical lens.

The optical function may comprise a dioptric function, light absorption, spectral function, diffractive function, scattering properties, polarizing capability, reinforcement or reduction of contrast, or any other related parameter.

The dioptric function corresponds to the optical lens power (mean power, astigmatism etc.) as a function of the gaze direction.

The wording "optical design" is a widely used wording known from the man skilled in the art in ophthalmic domain to designate the set of parameters allowing to define a dioptric function of an ophthalmic lens; each ophthalmic lens designer has its own designs, particularly for progressive ophthalmic lenses. As for an example, a progressive ophthalmic lens "design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. For example, a progressive lens design comprises:

a power profile along the main gaze directions (meridian line) used by the lens wearer during day life activities, distributions of powers (mean power, astigmatism, . . . ) on the sides of the lens, that is to say away from the main gaze direction.

These optical characteristics are part of the "designs" defined and calculated by ophthalmic lens designers and that are provided with the progressive lenses.

Progressive lens "optical designs" are tested through rigorous trials before being commercialized.

The term mounting parameter refers the position of the two optical lenses within the frame.

The mechanical aspect of the spectacle of the frame may not suit the head of the wearer when the wearer buys a new optical device.

Another embodiment of the disclosure relates to the mechanical aspect of the spectacle frame. The morphology of the head of the wearer may evolve over time. The change of the form of the head, or of the skin properties of the wearer may induce a displacement of the position of the optical element. The mechanical structure of the spectacle frame may also change over time, for example due to wear, improper use or storage, and result in a change in positioning of the spectacle frame on the face of the wearer.

The use of the optical device by the wearer corresponds to the manner the wearer may use the optical device. In the case of multifocal or progressive lenses, the wearer may use a single portion of the area of the optical lens. A wearer may for example always look through the far vision portion of the progressive lens even in situation of near vision if the wear fails to lower his/her eye gaze direction. The wearer will then compensate this insufficient lowering of the eye gaze direction by further lowering the head. Based on the head data monitored while using the optical device the processing circuitry may determine an abnormal head data upon usage of the optical device.

Another cause of mis-adaptation may be the integrity of the optical device such as a torsion of the temple of the bridge between the optical lenses. Any deformation of the optical device may result in a modified optical function provided by the optical device and said function may not be adapted anymore to the vision impairment of the wearer.

The optical device has a progressive additional power and the head data relates to the distribution of head lowering angle of the wearer when using the optical device. As mentioned earlier, a wearer producing insufficient lowering of the eye gazing direction may compensate this insufficiency by further lowering the head while using an optical element, for example progressive lenses in near vision. The abnormal head data relative to the further lowering of the head of the wearer are data that enable to determine a mis-adaptation of the optical device to the wearer.

The apparatus for detecting mis-adaptation may comprise a head data sensor or a plurality of head data sensors, the processing circuitry and the data storage medium. The apparatus may be removably attached to a portion of the optical device, for example the temples.

In an alternative embodiment, the apparatus for detecting mis-adaptation may be integrated within a spectacle frame. The calculation may also be performed outside the optical device: in a smartphone application, or a computer, or a cloud server, to which head data was transmitted.

A second aspect of the disclosure relates to a method performed by processing circuitry of an apparatus, the method comprising:

receiving and storing over time head data relative to the head of the wearer when wearing and using the optical device, processing the head data based on head data patterns associated with known mis-adaptation of an optical device to the wearer of said optical device, detecting mis-adaptation of the optical device to the wearer by matching the received and stored head data with head data patterns associated with mis-adaptation.

Figure 3:
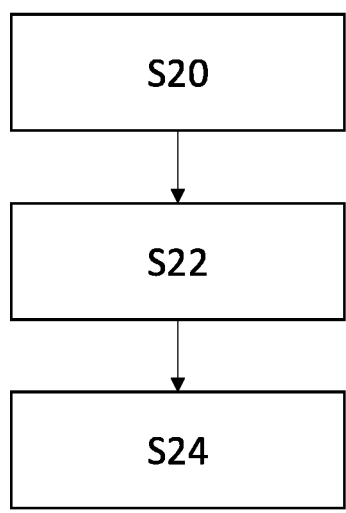
FIG. 3 illustrates a flowchart of the steps of the method for detecting mis-adaptation of an optical device to a wearer.

FIG. 3 is a flowchart showing the diverse steps corresponding to the method performed by the processing circuit.

The method comprises a receiving step S20, where the processing circuitry proceeds to the reception of wearer head data measured by the at least one head data sensor. The processing circuitry stores the measured head data on a data storage medium.

Further, the method comprises a processing step S22 where the processing circuitry proceeds to the comparison of the measured wearer head data and predefined head data patterns associated with a cause of mis-adaptation of an optical device to a wearer.

Finally, the method comprises a detecting step S24 where the processing circuitry proceeds to the detection of mis-adaptation of the optical device to the wearer. Said detection is made by matching the received and stored head data with head data patterns associated with mis-adaptation.

The term "matching" is to be understood as if there is a degree of likelihood above a given threshold between the wearer monitored head data and the head data pattern associated with a cause of mis-adaptation. It has to be understood that the degree of likelihood may correspond to a percentage of similitude between measured head data and stored head data pattern associated with causes of mis-adaptation. Such match may be determined using a machine learning method.

The threshold may correspond to a similarity of the measured head data pattern and the predefined head data patterns for example above a given percentage. Preferably determined with a machine learning method, which automatically determines the most likely status (for example Adapted/Mis-adapted) based on input head data.

The method may comprise an additional alerting step, during which the eye care professional and/or the wearer is alerted, in his everyday life activities, that there is a mis-adaptation of the optical device. Said alert may also inform the eye car professional that the optical device is not suitable for the wearer. The eye care professional may then check the prescribed pupillary distance, the prescription, the form of the frame, the design of the lens, or any other parameter related to the optical device.

The alert may be used to check whether with time the posture of the wearer is getting closer to an adaptation posture. This is a reason why there is a need to monitor the use of the optical device by the wearer over time and in the environment of his/her everyday life and not in a settled environment which may not correspond to the environment of the his/her everyday life.

The method may take into consideration the number of modes in the distribution of head lowering angles of the wearer when using the optical device.

The head data sensor records frame orientation or head lowering angle over time. The time for data acquisition may be predefined. The recorded frame orientations or head lowering angle are then transmitted to be processed.

Some of the measured data may be removed prior process for several reasons:

measured data are considered as outliers, measured data were acquired outside specific time periods, for example which do not correspond to working hours, measured data which do not correspond to the completion of a particular activity, and measured data that correspond to moment where the optical device was not correctly worn by the wearer.

Other parameters may be taken into consideration to remove measured data.

Figure 4:
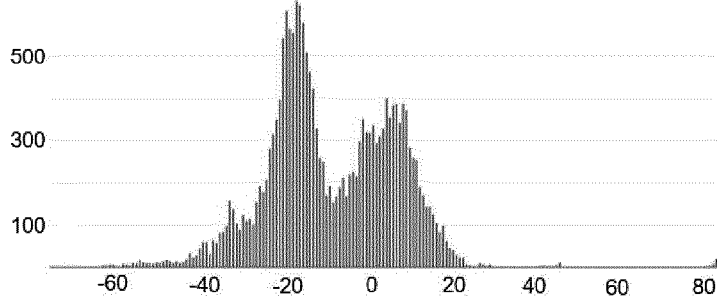
FIG. 4 illustrates a head lowering angle histogram of a wearer for the period of Monday to Friday.
Figure 5:
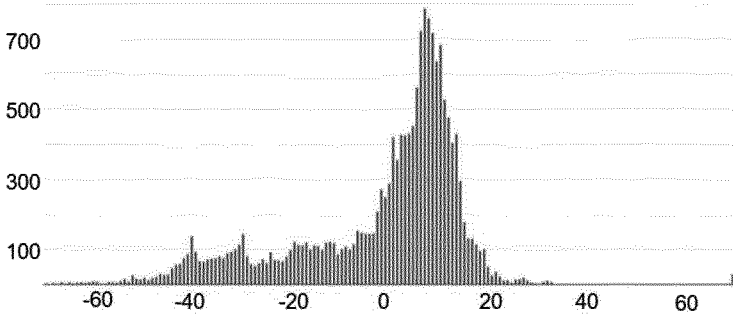
FIG. 5 illustrates a head lowering angle histogram of a wearer for the period of Saturday and Sunday.

We may consider the example of a wearer taking into consideration the optical device during the time spent at work. The FIG. 4 corresponds to the histogram of the head lowering angles from Monday to Friday. The FIG. 5 corresponds to the histogram of the head lowering angles from Saturday and Sunday. In the following example the wearer is considered to work from 9 AM to 6 PM from Monday to Friday, and to not work on the weekend. In such manner the measured data corresponding to FIG. 5 are removed and the period of time taken into consideration for FIG. 4 corresponds to the data relative to the head lowering angle measured between 9 AM and 6 PM.

The modes correspond to the peaks where the occurrence of the head lowering angles is the more important while achieving a particular activity, for example working in front of a computer.

Figure 6:
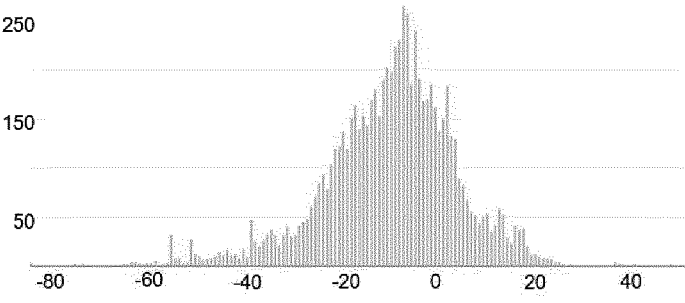
FIG. 6 illustrates unimodal head lowering angle histogram.

The histogram is unimodal if the distribution of the head lowering angle may follow a curve similar to a Gaussian distribution. When the histogram is unimodal, the optical device is adapted to the wearer. FIG. 6 discloses a unimodal histogram corresponding to the head lowering angles of the wearer while wearing the optical device.

Figure 7:
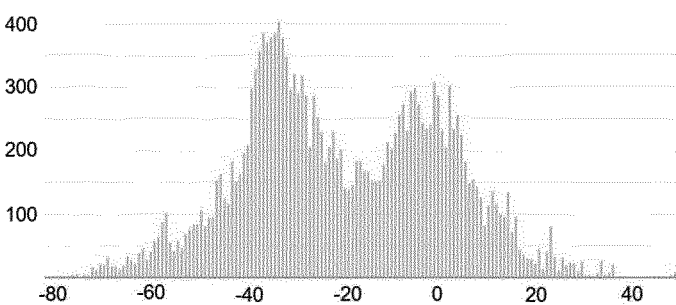
FIG. 7 illustrates bimodal head lowering angle histogram.

The distribution of the head lowering angles may comprise more than one peak. The distribution is then considered as a multimodal histogram. FIG. 7 discloses a bimodal histogram corresponding to the head lowering angles of the wearer while wearing the optical device. The FIG. 7 shows that there is not one specific range of head lowering angles but two ranges.

Bimodal histograms are an indicator that the wearer fails to adapt to the optical device. The wearer having a multifocal or progressive lens may try to compensate an inability to lower the eye gaze direction by further lowering the head angle.

In this manner, one of the two peaks shown may correspond to an abnormal head data such as further head lowering angle as mentioned in the example above. In particular, wearers equipped with progressive lenses and having a bimodal histogram have optical devices which are not adapted to them.

In order to properly use progressive lenses, a wearer of progressive lenses must learn to lower the eyes further than the natural gaze lowering when performing intermediate vision and near vision tasks. At the same time, the wearer will have to lower the head less than the natural head lowering when performing those tasks.

Wearers whose histogram is of bimodal type have not yet adopted the visual strategy required by progressive lenses. These progressive lenses wearer tend to look at near and intermediate objects through the far vision zone and do not experience the proper addition power required by the tasks. This results in a mis-adaptation and a discomfort for the wearer.

Following an optional alert signal, a progressive lens wearer which does not adapt to progressive lens may be recommended to realize specific visual training for the use of a progressive lenses.

A third aspect of the disclosure relates to a method of determining a head pattern, the method comprising:

receiving and storing wearer data relative to wearers of optical devices, receiving and storing optical device data relative to the optical device associated with each wearer, receiving and storing over time head data relative to the head of each wearer when wearing and using the associated optical device, receiving and storing adaptation data relative to the adaptation of the optical device associated with each wearer, processing the received and stored data over a large number of wearers to determine at least one head pattern associated with mis-adaptation of optical devices.

Figure 8:
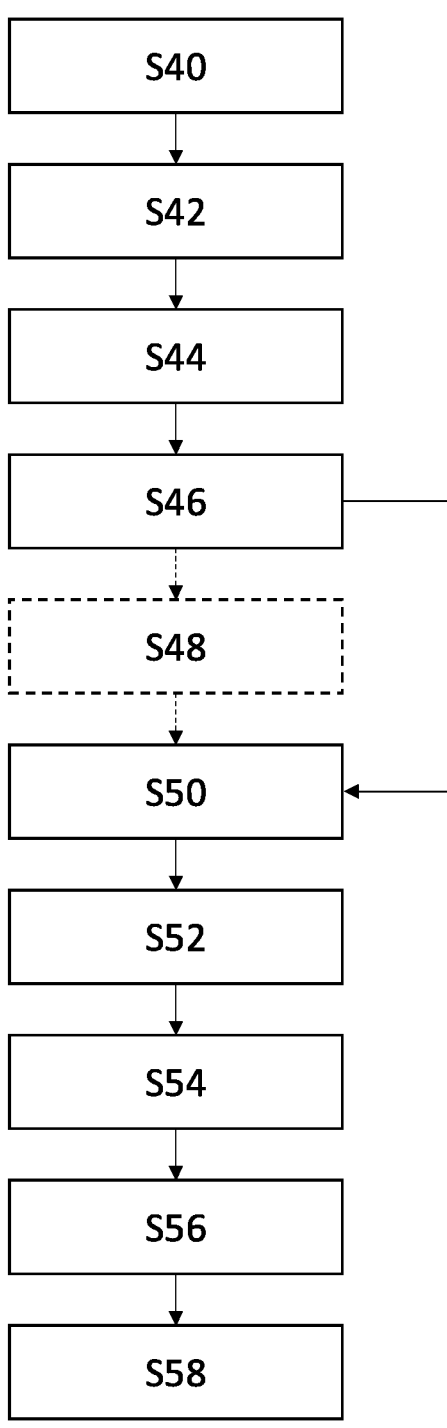
FIG. 8 illustrates a flowchart of the steps for determining a head pattern.

FIG. 8 illustrates a flowchart where the diverse steps of the method of determining a head pattern.

The method comprises a first receiving step S30, where the wearer data relative to wearers of optical devices are received and stored.

The method comprises a second receiving step S32, where the optical device data relative to the optical device associated with each wearer are received and stored.

The method comprises a third receiving step S34, where, over time, head data relative to the head of each wearer when wearing and using the associated optical device are received and stored.

Further, the method comprises a fourth receiving step S36, where adaptation data relative to the adaptation of the optical device associated with each wearer are received and stored.

Finally, the method comprises a processing step S38, where the received and stored data are processed to determine at least one head pattern associated with mis-adaptation of optical devices.

The head data according to the third aspect of the disclosure may comprise of head posture data, eye gaze direction, eyelid opening, pupil size.

The wearer data may comprise the ophthalmic prescription of the wearer and the optical device has an ophthalmic function.

The optical device data may comprise data relative to the optical function of the optical device and/or the mounting parameters of the optical device and/or the use of the optical device by the wearer and/or the ophthalmic prescription of the wearer.

Another method to determine at least one head pattern associated with mis-adaptation of optical devices is to correlate the monitored head data with feedbacks of the wearer.

The wearer may provide feedback regarding the worn optical device equipped with an apparatus for detecting mis-adaptation of an optical device to a wearer. The feedback may be performed by filling questionnaires relative to the comfort of the optical device and/or the adaptation of the wearer to his/her optical device in activities of the everyday life. Other sources of feedback may be possible, for example the use of a smartphone application. The wearer may use the application to notify source of discomfort or mis-adaptation when using the optical device.

According to the feedbacks provided by the wearers as well as the monitored data acquired by the at least one head data sensor to determine posture data pattern correlated with a level of adaptation of the optical device to the wearer, new mis-adaption posture pattern may be determined. The posture data pattern may be for example head data posture pattern.

According to an embodiment, posture data pattern is determined using a machine learning model used to find correlations between head data (and other optional data) and mis-adaptation.

The head data may consist of several time series of the following measures:

pitch angle of frame, as measured by IMU embedded in the frame, time derivative of yaw angle of frame, as measured by IMU embedded in the frame.

These 2 times series are obtained for a large number n of wearers (for instance, $i=1$ to 10000).

For each time series, a set of descriptive statistics is computed comprising:

the average value of the measure over time, the standard deviation of the measure over time, the amplitude (max-min) of the measure over time.

According to an embodiment, a histogram of the measured values may be further constructed, from which the central values of the main peaks and the widths of the main peaks can be deduced.

The descriptive statistics are grouped into a data vector, summarizing the head data. There is one such vector for each wearer. Such vector is denoted x_i.

The data relative to adaptation of the optical device associated with each wearer consists of a single number representing the degree of adaptation, from 1 (non-adaptation) to 10 (perfect adaptation). There is one value for each wearer. Such value is denoted v_i.

A machine learning model is initiated where the input data is the data vector of each wearer, and the data to predict is the number representing the degree of adaptation. The machine learning algorithm can be a multi-linear regression, random forest, neural network or any other relevant algorithm.

The model is trained and tested using the dataset of {x_i} and {v_i} to associate a vector {x_i} to an adaptation value {y_i}:

$$\text{Model } M(x\_i) \rightarrow v\_i$$

If the trained model gives a good prediction, it can be used to define head data patterns associated with mis-adaptation of optical devices.

A threshold T is defined based on the degree of adaptation. A wearer may be considered unadapted if:

$$v\_i \leq T$$

A head patterns x non-adapt is associated with mis-adaptation if for this head data, the model predicts a value below the threshold:

$$M(x\_non\text{-adapt}) = v\_non\text{-adapt} \leq T$$

This example does not make use of the wearer data or the optical device data. Those data can easily be added to the data vector x_i.

Other data may be monitored and associated to the head data, such as for example the activity carried out by the wearer when the head data are monitored. Indeed, a head pattern may be associated with a mis-adaptation when the wearer is carrying out a given activity and with no mis-adaptation or a different mis-adaptation when carrying out a different activity. For example, a posture pattern may be associated to mis-adaptation when the wearer is walking but not when the wearer is working at his desk. The activity carried out by the wearer may be determined based on his location, for example GPS location, or directly based on an input from the wearer.

The obtention of new mis-adaptation posture data patterns enables an improvement of the apparatus for detecting mis-adaptation over the time. The feedbacks of wearers enable to determine new cause of mis-adaptation.

According to the different histograms and/or the feedbacks, wearers may be segmented in different groups such as ability to perform a given task according to the type of optical lens they wear and/or their adaptability to use the optical device while performing a specific task, for example reading or working in front of computer. The optical devices may be single vision lenses, wide progressive lenses and narrow progressive lenses. In a preferred embodiment, segmentation is performed using a machine learning method where a model is trained to determine the segment to which a wearer belongs, segments may be defined by cause of mis-adaptation, based on head data and other optional data.

Thanks to the segmentation of the wearers, the mis-adaptation detecting method may predict mis-adaptation to progressive lens A fourth aspect of the disclosure relates to an alternative method for detecting mis-adaptation to an optical device A fifth aspect of the disclosure relates to non-transitory computer-readable storage medium.

The non-transitory computer-readable storage medium may include computer executable instruction, wherein the instructions, when executed by a computer or a processing circuitry, cause the computer or the processing circuitry to perform a method for detecting mis-adaptation and/or a method for determining a head pattern associated with mis-adaptation.

The method comprises a first receiving step S40, where data relative to wearers, for example prescription, gender and/or age are received and stored in a database.

The method comprises a second receiving step S42, where data relative to the optical device are received and stored in the database. The data relative to the optical device may comprise optical lens design, AR coating, anti-smudge, and/or any other parameter relative to optical devices.

The method comprises a third receiving step S44, where data measured by the at least one head data sensor are stored in the database. The measured data may comprise head motion, posture and lowering angle, light intensity, distance to an object and/or whether the wearer is wearing or not the optical device over time.

The method comprises a fourth receiving step S46, where feedback relative to a mis-adaptation are received and stored in the database. The feedback may have been provided by a smartphone application or an online survey.

The method may comprise a fifth and final receiving step S48, where the causes of mis-adaptation are received and stored in the database.

Data relative to the database may be provided by real wearers through surveys and/or feedbacks via a smartphone application or via an eye care professional.

Data relative to the database may be also provided based on simulated virtual wearers using an avatar having a wrong prescription, wrongly fitted optical device, and compute their head postures and/or head data for various visual tasks.

The database may comprise a combination of data related to real and virtual wearers.

The method comprises a first analyzing step S50, where the data stored in the database are analyzed to determine head data patterns that are specific to a given case of mis-adaptation.

The method further comprises a model creating step S52, where a model is created to predict potential mis-adaptation and mis-adaptation cause based on the database. The creation of the mode may be achieved by machine learning, for example using a neural network.

During the learning phase of the machine learning, convergence to potential mis-adaptations and mis-adaptation causes may be improved by getting feedbacks from the wearers. The improvement may be provided using reinforcement learning methods.

The method comprises a second analyzing step S54, where for a new wearer equipped with an optical device having an apparatus for detecting mis-adaptation according to the disclosure, data provided by the head data sensor are analyzed.

The method comprises an alerting step S56, where if the data measured by the head data sensor correspond to a pattern of mis-adaptation, an alert device of the apparatus according to the disclosure alerts the wearer or eye care professional.

If the head data pattern permits to identify the cause of mis-adaption, the information may be added in the database.

The method comprises an optical device providing step S58, where in the case the tested optical device is not adapted to the wearer, a new optical device is proposed to the wearer taking into consideration the cause of mis-adaptation and the data stored in the database.

Alternatively, the method may suggest, based on the cause of mis-adaptation, a readjustment of the tested optical device or a vision training.

The readjustment of the optical device may be related to the change for another design of the optical lenses or the frame of the optical device.

The training may be a specific training to improve the adaptation of the wearer to a specific optical device, for example progressive lenses.

The method may be performed by the processing circuitry or may be processed by a device external to the apparatus according to the disclosure, for example in a cloud network.

The database may comprise additional data obtained for example by optometric tests. The additional data may be the convergence insufficiency, accommodating lag, fixation disparity, longer head posture or gaze stabilization, etc. provided by at least a part of the real and/or virtual wearers.

The head data sensor may be of another type of sensor than IMU, for example an eye-tracker measuring the gaze direction. The eye-tracker may be integrated in the frame of the optical device.

The head data sensor may measure the pupil size or facial expression, for example including eyebrow position. The head data sensor measuring the pupil size or facial expression may be an integrated camera.

The head data sensor may measure EEG (Electroencephalography) data.

The head data sensor may be used to determine the wearing time of the optical device and the time where the optical device is not worn, and optionally the type of task carried out by the wearer. Thanks to this parameter, a mis-adaptation may be detected. The wearer may not wear often the optical device due to a discomfort induced by the shape of the optical device once worn. Shape issues may be due to size of the frame at temples level or the form and/or the size of the nose pad. Based on these data, the eye care professional may be alerted that a readjustment of the optical device is necessary.

The disclosure relates to head data. However head data may be replaced by other types of data related to the body of the wearer. The data may be for example related to the posture or the motion of a part of the body of the wearer which is not the head.

Many further modifications and variations will be apparent to those skilled in the art upon making reference to the foregoing illustrative embodiments, which are given by way of example only and which are not intended to limit the scope of the disclosure, that being determined solely by the appended claims. In particular the disclosure may apply to active lenses, where the optical design of the active lens may be modified so as to improve the wearer adaptation. The disclosure may further apply to an active filter where the optical transmission function may be adapted taking into account the comfort of the wearer.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. An apparatus for detecting a cause of mis-adaptation of an optical device to a wearer, the apparatus comprising:
   at least one head data sensor configured to measure head data;
   a data storage medium configured to store the head data; and
   processing circuitry operably coupled to the at least one head data sensor and the data storage medium and configured to:
   receive and store over time head data relative to a head of the wearer when wearing and using the optical device;
   processing the head data based on head data patterns associated with known mis-adaptation of an optical device to the wearer of said optical device; and
   detect mis-adaptation of the optical device to the wearer by matching the received and stored the head data with head data patterns associated with the mis-adaptation.

2. The apparatus according to claim 1, wherein the head data comprises at least one of head posture, motion data, eye gaze direction, eyelid opening, pupil size, EEG data, and facial expression.

3. The apparatus according to claim 1, wherein
   the optical device has an ophthalmic function, and
   the processing circuitry is further configured to receive an ophthalmic prescription of the wearer and to consider said ophthalmic prescription when comparing the received and stored head data with the head data patterns.

4. The apparatus according to claim 1, wherein the processing circuitry is further configured to determine a cause of the mis-adaptation of the optical device by comparing the received and different set of stored head data with head distribution patterns associated with the cause of mis-adaptation.

5. The apparatus according to claim 1, wherein the optical device has a progressive additional power and the head data relates to a distribution of head lowering angles of the wearer when using the optical device.

6. A method for detecting a cause of mis-adaptation of an optical device to a wearer performed by processing circuitry of an apparatus, the method comprising:
   receiving and storing over time head data relative to the head of a wearer when wearing and using an optical device;
   processing the head data based on head data patterns associated with known mis-adaptation of an optical device to the wearer of said optical device; and
   detecting mis-adaptation of the optical device to the wearer by matching the received and stored head data with the head data patterns associated with the mis-adaptation.

7. The method according to claim 6, wherein the head data comprises at least one of head posture, motion data, eye gaze direction, eyelid opening, pupil size, EEG data, and facial expression.

8. The method according to claim 6, wherein the optical device has an ophthalmic function and the method further comprises receiving an ophthalmic prescription of the wearer and considering said ophthalmic prescription when comparing the received and stored head data with the head data patterns.

9. The method according to claim 6, wherein the method further comprises determining a cause of the mis-adaptation of the optical device by comparing the received and stored head data with head data patterns.

10. The method according to claim 6, wherein the optical device has a progressive additional power and the head data relates to a distribution of head lowering angles of the wearer when using the optical device.

11. The method according to claim 10, wherein detecting mis-adaption comprises determining a number of modes in the distribution of head lowering angles.

12. A non-transitory computer-readable storage medium including computer executable instructions, wherein the instructions, when executed by a computer, cause the computer to perform a method according to claim 6.

13. A method of determining a head pattern associated with mis-adaptation of an optical lens, the method comprising:

receiving and storing wearer data relative wearers of optical devices;

receiving and storing optical device data relative the optical device associated with each wearer by processing circuitry;

receiving and storing over time head data relative to the head of each wearer when wearing and using the associated optical device by the processing circuitry;

receiving and storing adaptation data relative to adaptation of the optical device associated with each wearer by the processing circuitry;

processing, by the processing circuitry, the received and stored data over a number of wearers to determine at least one head pattern associated with mis-adaptation of optical devices using a machine learning model to find correlations between the head data and the mis-adaptation; and automatically generating an alert to the wearer or a practitioner, by an alert device, in response to detection of the head pattern associated with mis-adaptation.

14. The method according to claim 13, wherein the head data comprises at least one of head posture data, eye gaze direction, eyelid opening, pupil size, EEG data, and facial expression.

15. A non-transitory computer-readable storage medium including computer executable instructions, wherein the instructions, when executed by a computer, cause the computer to perform a method according to claim 13.

* * * * *